US008688675B2

(12) United States Patent
Albers et al.

(10) Patent No.: US 8,688,675 B2
(45) Date of Patent: Apr. 1, 2014

(54) TRAJECTORY-BASED VIDEO RETRIEVAL SYSTEM, AND COMPUTER PROGRAM

(75) Inventors: Rob Albers, Nijmegan (NL); Egbert Jaspers, Well (NL); Rob Wijnhoven, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 318 days.

(21) Appl. No.: 12/160,628

(22) PCT Filed: Feb. 27, 2006

(86) PCT No.: PCT/EP2006/060300
§ 371 (c)(1),
(2), (4) Date: Jul. 11, 2008

(87) PCT Pub. No.: WO2007/096003
PCT Pub. Date: Aug. 30, 2007

(65) Prior Publication Data
US 2010/0169330 A1     Jul. 1, 2010

(51) Int. Cl.
*G06F 17/30*     (2006.01)
(52) U.S. Cl.
CPC ............................ *G06F 17/30831* (2013.01)
USPC ......................................... 707/706; 707/769
(58) Field of Classification Search
CPC .............................................. G06F 17/30831
USPC ............................................... 707/706, 769
See application file for complete search history.

(56) References Cited

U.S. PATENT DOCUMENTS

| | | | |
|---|---|---|---|
| 6,587,574 B1 | 7/2003 | Jeannin | |
| 6,665,423 B1* | 12/2003 | Mehrotra et al. | 382/107 |
| 6,741,655 B1* | 5/2004 | Chang et al. | 375/240.26 |
| 6,795,567 B1* | 9/2004 | Cham et al. | 382/103 |
| 2002/0114394 A1* | 8/2002 | Ma | 375/240.16 |
| 2005/0280657 A1* | 12/2005 | Hori et al. | 345/619 |
| 2006/0088191 A1* | 4/2006 | Zhang et al. | 382/107 |
| 2006/0256210 A1* | 11/2006 | Ryall et al. | 348/231.2 |

OTHER PUBLICATIONS

Dagtasm S., "Trail-based approach for video data indexing and retrieval," Jul. 1999, International Conference on Multimdia Computing and SYstems, 1999, pp. 235-239, vol. 2.*
Jaspers, et al. "Candela—Storage, Analysis, and Retrieval of Video Content in Distributed Systems: Real-Time Video Surveillance and Retrieval," 6 Jul. 6, 2005, IEEE International Conference on Multimedia and Expo, p. 1553-1556.*
Beng Chin Ooi et al: "Frequent Update and Efficient Retrieval . . . " Proceedings of the Third Internation Conference on Web Information Systems Engineering (Workshops), Dec. 11, 2002, pp. 3-12 (in English).

(Continued)

*Primary Examiner* — Christyann Pulliam
*Assistant Examiner* — Charles Adams
(74) *Attorney, Agent, or Firm* — Michael J. Striker (57) ABSTRACT

A video retrieval system is proposed that retrieves trajectory data from a database as a response to a search query. The search query is formulated on the basis of a search trajectory, which is represented as a plurality of search segments. Minimum hounding areas are generated, whereby the plurality of the minimum hounding areas cover the search trajectory or at least one of the search segments. The video retrieval system accesses the database by using at least one of the minimum bounding areas as a query area, whereby the minimum bounding areas of the plurality of bounding areas are arranged overlap-free and/or adjacently or with a search trajectory independent overlap.

10 Claims, 5 Drawing Sheets

(56) References Cited

OTHER PUBLICATIONS

Seok-Lyong Lee et al: "Similarity Search for Multidimensional Data . . ." Proceedings of the 16-th International Conference on Data Engineering, Feb. 29, 2000, pp. 599-608 (in English).

Albers, R., et al: "Smart Search & Retrieval on Video Databases" Digest of Technical Papers, International Conference on Consumer Electronics, ICCE'06, Lag Vegas, NV, USA, IEEE, Jan. 7, 2006, pp. 475-476 (in English).

Dieter Pfoser et al: "Novel Approaches to the Indexing . . ." Proceedings of the 26-th International Conference on Very Large Data Bases, Sep. 10, 2006, pp. 395-406 (in English).

* cited by examiner

TRAJECTORY-BASED VIDEO RETRIEVAL SYSTEM, AND COMPUTER PROGRAM

CROSS-REFERENCE

The invention described and claimed hereinbelow is also described in PCT/EP2006/060300, filed on Feb. 27, 2006. This patent application, whose subject matter is incorporated here by reference, provides the basis for a claim of priority of invention under 35 U.S.C. 119 (a)-(d).

BACKGROUND OF THE INVENTION

The invention relates to a video retrieval system for retrieving video data. More specifically the invention relates to a video retrieval system with a retrieval means for retrieving trajectory data from a database as a response to a search query, whereby the search query is formulated on the basis of a search trajectory, which is representable and/or represented as a plurality of search segments, whereby the retrieval means comprises interpreting means for generating a plurality of minimum bounding areas, whereby the plurality of the minimum bounding areas covers the search trajectory or at least one of the search segments and whereby the retrieval means is realised for accessing the database by using at least one of the minimum bounding areas as a query area. Further the invention relates to a respective method and a computer program.

Nowadays, video cameras are often used for monitoring areas under surveillance. For monitoring more complex surroundings a plurality of video cameras are commonly employed, whereby the resulting data from the plurality of video cameras is viewed on-line or stored in data-bases and checked off-line. With a growing number of video cameras also the amount of the stored video data is increasing rapidly, which finally results in an enormous effort to search through the video data on- or off-line in case a time instance or location of a certain interesting event is unknown. Improvements are achieved by using systems for content-based indexing and retrieval of video data.

In the field of moving-objects-tracking it is known to use video content analysis algorithms (VCA) in order to support the search and the retrieval of video data, whereby in a first step the video camera images are segmented into static background and moving objects. In a further step these objects are tracked over time and the locations of the objects in each frame are extracted. The set of locations of each object over the life-time of the object is converted into a trajectory for each object. These trajectories can be stored in a database and used to search through the recorded video camera images.

The document U.S. Pat. No. 6,587,574 B1 discloses a system and a method for representing trajectories of moving objects for content-based indexing and retrieval of visually animated data. The method comprises the steps as elucidated above, whereby a descriptive data structure is generated on the basis of the extracted trajectories and whereby the descriptive data structure comprises at least trajectory data representative for the position, velocity and/or acceleration of the moving object.

A solution for an effective storage and retrieval of the video data is disclosed in the scientific article from A. Albers, R. Wijnhoven, E. Jaspers and P. d. With, Smart Search & Retrieval On Video Databases, 2006, Digest of Technical Papers, IEEE International Conference on Consumer Electronics (ICCE), Las Vegas, Nev., USA, January, 2006, which appears to be the closest state of the art. The authors propose in this article to use a hierarchical structure in the form of a so-called Re*-tree for indexing the video data, which is based on the idea of indexing the trajectories of moving objects by dividing the trajectories into segments, which are allocated to so-called minimum bounding rectangles. In order to optimize the data-structure, the authors propose to apply a spatial filtering on the trajectories prior to allocating the segments to the minimum bounding rectangles.

SUMMARY OF THE INVENTION

The video retrieval system and/or apparatus is preferably realised for retrieving video data, especially video sequences, images etc. For that purpose the video retrieval system provides retrieval means which is adapted and/or realised to retrieve trajectory data from a database, whereby the database is preferably part of the video retrieval system. The trajectory data is retrieved as a response to a search query, whereby the search query is formulated on the basis of a search trajectory, which (i.e. the search trajectory) is representable and/or represented as a plurality of search segments. The search trajectory is preferably expressed as a spatial trajectory and/or in spatial representation. In preferred embodiments the search trajectory is a line and/or the search segments are realised as line segments. Preferably, the retrieved trajectory data is linked to and/or pointing at the video data and/or the video sequences corresponding to the retrieved trajectory data, so that the video data and/or the video sequences corresponding to the retrieved trajectory data can be retrieved. Trajectory data is preferably defined as data comprising trajectory information of the moving object, whereby the information includes for example information representative for a position, a velocity and/or an acceleration of the moving object.

The retrieval means comprises interpreting means for generating a plurality of minimum bounding areas, whereby in a spatial representation the plurality of the minimum bounding areas covers the search trajectory or at least one of the search segments. In the first alternative, the plurality of minimum bounding areas covers the complete search trajectory, in the latter alternative, the plurality of minimum bounding areas covers especially one or two and/or more search segments. The covering is preferably realised so that the plurality of the minimum bounding areas in their entirety covers an area in which the search trajectory and/or at least one search segment is lying.

Furthermore the retrieval means is realised to access the database by using at least one of the minimum bounding areas as a query area. Preferably the retrieval means is programmed and/or wired and/or comprises a circuit to provide the above-identified features. The minimum bounding areas are used as sub-queries, whereby the database returns trajectory data of trajectories and whereby the trajectories preferably are indexed by indexing bounding areas overlapping with the respective query area and/or comprise interpolating points lying inside the query area.

According to the invention the minimum bounding areas of the plurality of bounding areas are arranged overlap-free and/or adjacently or with a search trajectory independent overlap. The search trajectory-independent overlap is preferably pre-defined for example as a system parameter and/or is dependent from the distance of single location and/or interpolating points of the trajectories stored in the database.

The underlying idea and the main benefit of the invention is to realize the retrieval means so that the overlap of the minimum bounding areas is minimised. It is most preferred to arrange the areas overlap-free, but for technical reasons in some applications an overlap concerning the borderlines and/or an overlap in general is necessary to improve the programming of the respective algorithm As preferably each minimum bounding area is used as a sub-query, the overall overlap between the plurality of the minimum bounding areas on the one hand side and indexing bounding areas on the other side is minimized and thus the number of double results and consequently the search time is decreased.

Preferably means are provided for formulating different kinds of search queries, which preferably allow an intuitive search. Non-restricting embodiments are: Area-of-interest query in order to retrieve trajectory data about moving objects passing through, entering and/or leaving a selected area of interest and/or having a trajectory overlapping with the area-of-interest. Line-crossing query in order to retrieve trajectory data about moving objects crossing a selected line. Trajectory-by-sketch search in order to retrieve trajectory data about moving objects having a trajectory similar or identical to a sketched trajectory. Trajectory-by-example query in order to retrieve trajectory data of trajectories, which are similar and/or identical to a selected trajectory of a moving object. One-click-trajectory in order to retrieve trajectory data of trajectories which are similar to an example trajectory which is selected by a computer-mouse click or by another typical user input action. The example trajectory is preferably a result trajectory of a prior query. Alternatively an object is selected, the trajectory of the object is retrieved in a first step and in a second step all trajectories similar to the retrieved trajectory of the selected object are retrieved. These or further different kinds of search queries are optionally combinable with further conditions concerning velocity, moving direction, acceleration, colour and/or type of the moving object and/or the like.

In a preferred embodiment, the minimum bounding areas and/or the indexing bounding areas are realized as rectangles. In this preferred embodiment, the trajectories in the database are indexed by indexing bounding rectangles, preferably as disclosed in the above-introduced paper from A. Albers, R. Wijnhoven, E. Jaspers and P. d. With, which is incorporated herein by reference in its entirety, especially concerning the sections "data representation" and "database access method". Also preferred is the use of a hierarchical database structure, especially an R-tree or an R*-tree structure or another hierarchical spatial data structure. The borderlines of the minimum bounding areas and the borderlines of the indexing bounding areas are preferably parallel or perpendicular to each other, so that the possible trajectory independent overlap is also rectangle-shaped.

In a further embodiment the video retrieval system comprises segmenting means realised to divide the search trajectory in search segments, which are preferably line segments. Preferably the segmenting means are embodied to divide the search trajectory in linear and/or straight and/or quasi-linear and/or quasi-straight segments. Preferably a plurality of minimum bounding areas is generated for each segment.

It is further preferred that the video retrieval system comprises filtering means for spatial filtering the trajectories, especially prior to processing and/or storing the trajectories. The spatial filtering is especially adapted to derive interpolating points from the location points of the trajectories and thus to reduce the number of location points of the trajectory while preferably preserving the directional and/or spatial information. The spatial filtering is for example realised by a low-pass filter and/or by a filter using spatial bounding tubes and/or spatial maximum distance circles as described in the above-introduced paper from A. Albers, R. Wijnhoven, E. Jaspers and P. d. With. The spatial filtering is applied on the trajectories prior to storing in the database and/or on the search trajectory.

Further advantages are achievable by an optional embodiment of the invention, wherein the video retrieval system provides ranging means, which is realised for generating a minimum matching range for the single search segment and/or for the search trajectory, whereby the plurality of minimum bounding rectangles are realised to cover the minimum matching range. Preferably the minimum matching range covers the area in a minimum distance from the single search segment and/or from the search trajectory, whereby the minimum distance is preferably defined by the characteristics of the filtering means. In case of a spatial filtering the minimum distance is preferably defined in respect to the maximum or mean distance between two (filtered) interpolating points of the trajectories stored in the database and/or of the search trajectory, especially as half of the maximum distance between two filtered interpolating points. Particularly, the ranging means allows to compensate for negative effects of the filtering means, as the filtering means narrows the spatial extension of the trajectories in the database, thus resulting in a possible loss of matching trajectories. In order to restitute and/or compensate the lost area of the indexing minimum bounding boxes, the ranging means increases artificially the extension of the search trajectory or search segments by generating the minimum matching range.

In a very useful optional embodiment the interpreting means are realised to generate an intermediate bounding box for the single search segment and/or search trajectory and to split the intermediate bounding box into the plurality of minimum bounding boxes, whereby preferably one single intermediate bounding box is generated per search segment and/or search trajectory. Preferably the intermediate box is split and optionally partially cancelled, so that the area covered by the generated minimum bounding boxes in their entirety is smaller than the area of the respective intermediate bounding box. The partially cancelling of the intermediate box is preferably achieved by adapting the minimum bounding boxes to the minimum matching range of the respective search segment. Preferably the number of rectangle split-ups is dependent on the length of the respective search segment and/or on the angle between the search segment and the preceding and/or the following search segment of a search trajectory and/or on the angle of the search segment relative to the orientation of the rectangles of the indexing bounding boxes. Further preferably a maximum split-up factor is defined by the distance between the interpolating points of the trajectories stored in the database, whereby the maximum split-up factor satisfies the condition that a minimum diameter of minimum bounding boxes is larger or equal to the minimum distance of the interpolating points.

The invention further proposes a video retrieval system according to the preamble of claim 1 and/or to one of claims 1 to 6, whereby prioritising means realised for allocating a search priority to search objects, like the search trajectories and/or the search segments and/or the minimum bounding areas, are provided, preferably comprising the further features of one or any of the claims 1 to 6. With the option of allocating priorities the video retrieval system allows, that search trajectories, search segments and/or minimum bounding areas with a higher priority level are processed with a higher system performance than such search objects with a lower priority level and/or are processed prior and/or before such search objects with a lower priority level.

In a further embodiment, the prioritising means comprise and/or are connected with input means for setting the priorities manually, especially by a user interaction. Alternatively the prioritising means are realised for setting the priorities automatically, especially dependent on a busyness and/or density table of the search area defined by the search trajectory, search segment or minimum bounding area. Preferably search areas with a higher density of stored trajectories and/or busyness of stored moving objects are allocated to a lower priority level, whereas areas with a lower density are allocated to a higher priority level. The underlying idea is that results from search areas with a lower density and/or busyness allow a faster retrieval of results, so that first results at least concerning the higher prioritised areas are retrieved quickly.

Further preferred is that the prioritising means allow a combination of manual and automatic prioritisation, whereby preferably in a first step priorities are set manually and in a second step sub-priorities are set automatically (or vice versa) and/or search segments and/or minimum bounding areas without a manually set priority are allocated to a priority automatically. Further a preferably automatically sub-priorisation is possible.

In a very useful embodiment, the video retrieval system is realised for retrieving and/or displaying intermediate results on the basis of results of higher prioritised search segments and/or minimum bounding areas without using results of lower prioritised search segments and/or minimum bounding areas. The intermediate results are trajectories stored in the database and/or trajectory data thereof. This embodiment allows for example that intermediate results concerning a search trajectory with more than two search segments are retrieved and/or displayed when only one or a subset of the search segments are searched in the database, so that preliminary but early feedback is provided for the user. Especially, the video retrieval system is realised to provide intermediate results after each sub-query.

The method for retrieving video data according to claim 11 uses preferably a video retrieval system as described above and comprises the steps of:

formulating a search query on the basis of a search trajectory, which is representable and/or represented as a plurality of search segments, generating a plurality of minimum bounding areas, whereby the plurality of the minimum bounding areas covers the search trajectory or at least one of the search segments and whereby the minimum bounding areas of the plurality of bounding areas are arranged overlap-free and/or adjacently or with a search trajectory independent overlap and/or allocating search priorities to the search trajectories and/or to the search segments and/or to the minimum bounding areas, accessing a database by using at least one of the minimum bounding areas as a query area within the search query and retrieving trajectory data from the database as a response to the search query. Preferably the retrieved trajectory and/or trajectory data is compared with the search query for evaluating the match quality.

Optionally the method comprises the steps of filtering with the filtering means and/or segmenting with the segmenting means and/or splitting up with the interpreting means and/or allocating priorities with the prioritizing means and/or presenting intermediate results with the retrieving and/or displaying means.

BRIEF DESCRIPTION OF THE DRAWINGS

For a more complete understanding of the invention and the advantages thereof reference is made to the following descriptions taken into conjunction with the accompanying drawings, wherein similar numbers designate similar objects. The drawings show.

DETAILED DESCRIPTION OF THE PREFERRED EMBODIMENTS

Figure 1:
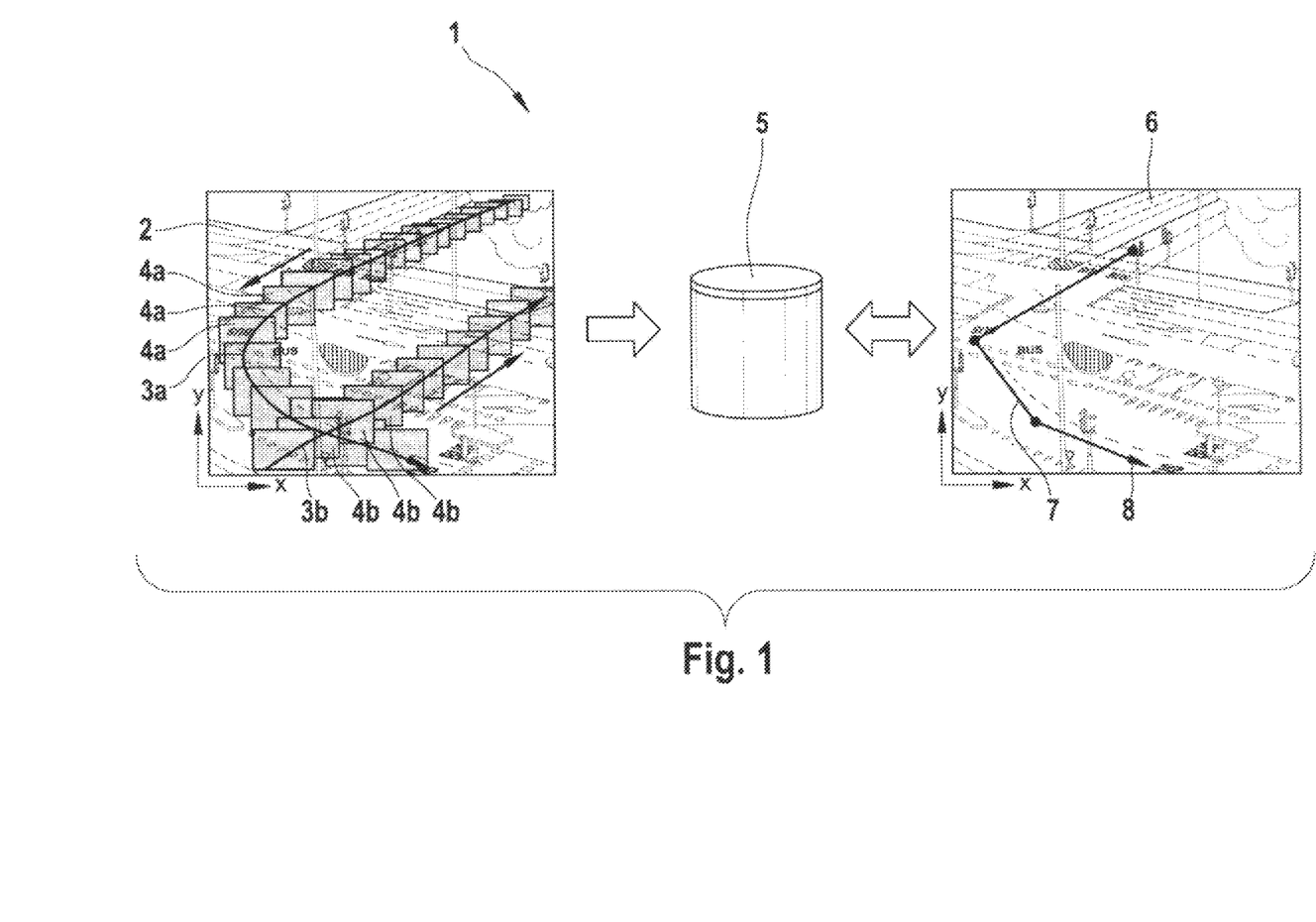
FIG. 1 a schematic overview of a video retrieval system as a first embodiment of the invention.

FIG. 1 shows a schematic overview of the general concept of a video retrieval system 1. On the left hand side of FIG. 1 object tracking is illustrated by means of an image 2 of a traffic crossing with overlaid trajectories 3a and b and object detection windows 4a and 4b. In the image 2 two lines are shown representing two trajectories 3 a and b of two different moving objects. The trajectories 3 a and b are extracted from a sequence of video frames, whereby in a first step a segmentation and detection algorithm returned the shape and position of each of the moving objects and in a second step each moving object is tracked over its lifetime in the video sequence So the location points of the moving objects in the video frames are used to form the trajectories 3a, b, whereby the trajectories 3a and b are interpolating the centre (or another point) of the object detection windows 4a and 4b respectively, which are object bounding boxes on a frame-by-frame basis. These trajectories 3a, b each being represented by the set of the trajectory-forming location points are filtered and stored in a database 5 as explained later.

On the right hand side an image 6 of the traffic crossing is shown, which is similar or identical to the image 2. In image 6 sketched line-segments 7 are drawn, with one end realised as arrowhead 8. The sketched line 7 represents a trajectory for a search query in the database 5 for similar trajectories. The arrowhead 8 indicates the moving direction of an object in connection with the search trajectory.

Figure 2:
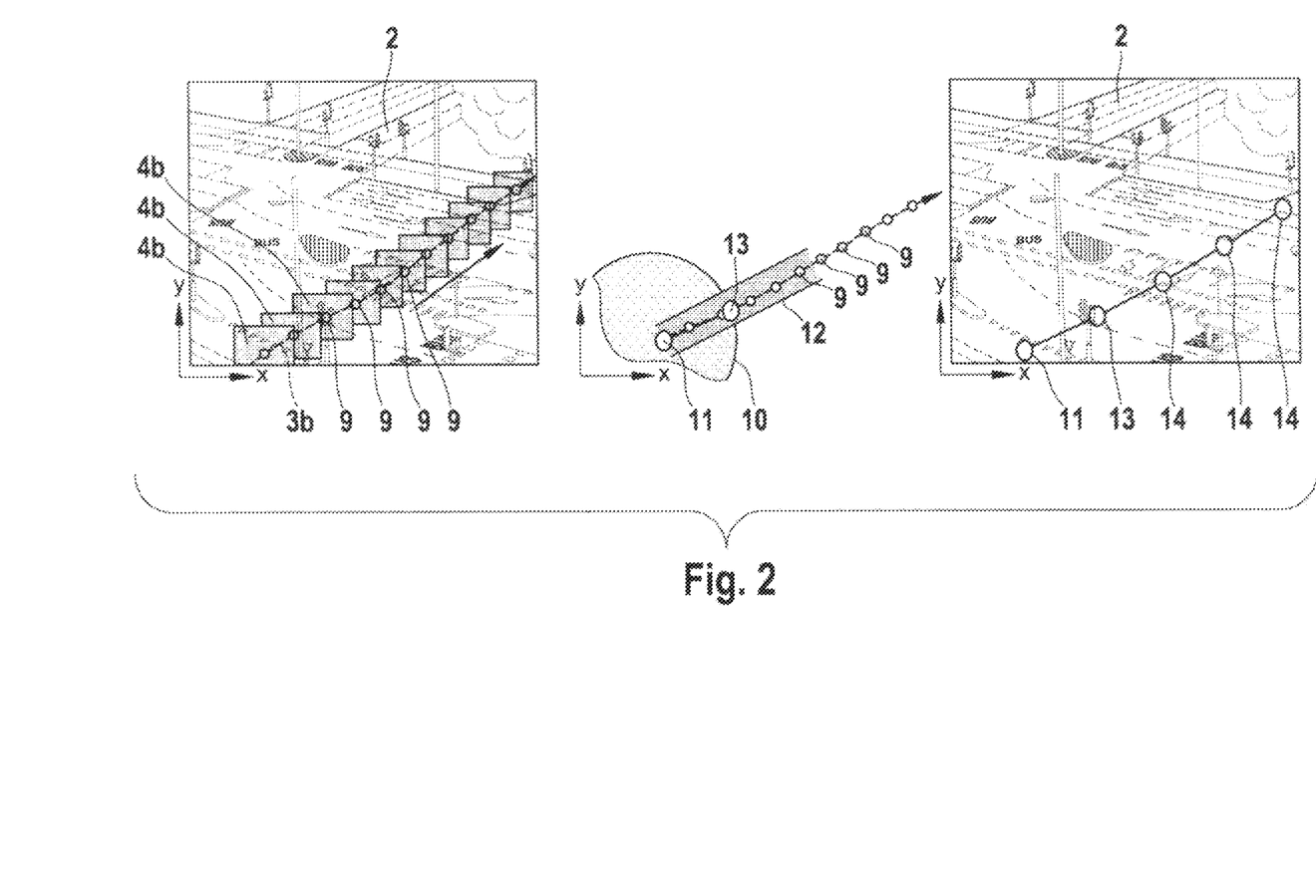
FIG. 2 a schematic overview to illustrate extracting and filtering of trajectories as preferably used in the video retrieval system in FIG. 1.

FIG. 2 illustrates schematically the extracting and filtering of the trajectory 3b as preferably used in the video retrieval system 1 in FIG. 1. On the left hand side—again—is the image 2 with the trajectory 3b, the bounding boxes 4b and additionally a set of locations points 9, each representing the centre of a bounding box 4b corresponding to a single frame of the frame sequence. This set of location points 9 is the input for a filtering algorithm as illustrated in the middle of FIG. 2. The set of location points 9 is filtered by a spatial correlation algorithm, whereby preferably all location points which are within a predetermined maximum distance defined by a circle 10 around a preceding filtered location point 11 and/or which are within a maximum direction deviation range defined by a tube 12, which is arranged around the location points 9, are cancelled. Optionally new points 13 can be created in case no location point 9 of the trajectory 3b lies on the circle 10 and the currently considered trajectory point lies outside the circle 10, and/or a new point can be created on the edge of tube 12 in case the currently considered trajectory point lies outside the tube 12. The output of the filtering algorithm is represented on the left side of FIG. 2 showing a smaller set of interpolating points 11, 13, 14 representing the trajectory 3b.

Figure 3:
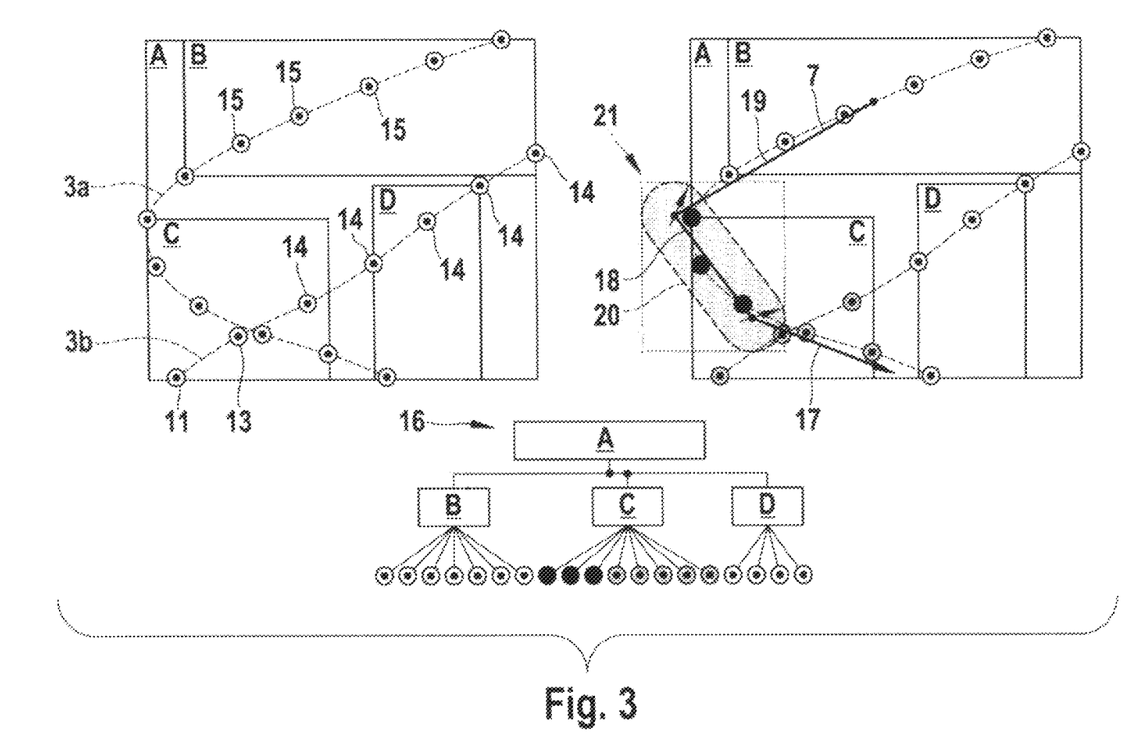
FIG. 3 a schematic overview of the hierarchical storing of the filtered or pre-processed trajectory and of the retrieval thereof, preferably used in the video retrieval system in FIG. 1.

FIG. 3 illustrates the hierarchical storage of the filtered trajectory data in the database 5 and the database access method.

In the upper left corner of FIG. 3 the filtered trajectories 3b and a with filtered location points or interpolating points 11, 13, 14 and 15 respectively are shown. Each trajectory 3a and b is represented by a first minimum bounding rectangle A, which only contains the information about the outer limit and the position of the complete filtered trajectories 3a and b. In a further step the filtered trajectories 3a, b are split up into sub-trails which are represented by minimum bounding rectangles B, C and D respectively, whereby preferably the rectangles B,C and D are arranged within the rectangle A without overlap. The rectangles B, C, D carry the information about the outer limit and the position of the respective sub-trails arranged therein.

In the lower part of FIG. 3 a tree-like data structure 16 is shown, for example an R*-tree. The data structure 16 is indexed by the rectangles A, B, C and D and carries and/or is linked with the information about the trajectories 3a, b and sub-trails. The small circles of the tree are called children of the tree and represent the actual stored trajectory points. So summarized the interpolating points of the filtered trajectories 3a and 3b and further trajectories are distributed between the lowest level of the hierarchical structure, whereby the lowest level is indexed by the minimum bounding rectangles B, C and D.

In the upper right corner of FIG. 3 the database access method in case of a query on the basis of the sketched line-segments 7 concerning a trajectory is demonstrated. First the sketched line-segments 7 are divided in segments 17, 18 and 19. In the following the database access method in connection with the middle line segment 18 is described as an example. In a further step a range window 20 is placed automatically over the middle segment 18 to define a limited matching range. The range window 20 has preferably a curved borderline, whereby the borders of the range window 22 are defined for example by a minimum distance to the trajectory points of the middle query segment 18 and/or to the middle query segment 18 itself. In a subsequent step the range window 20 is converted in an intermediate search minimum bounding rectangle 21, whereby the borders of the intermediate search minimum bounding rectangle 21 are parallel to the borders of the minimum bounding rectangles A, B, C or D.

Figure 4:
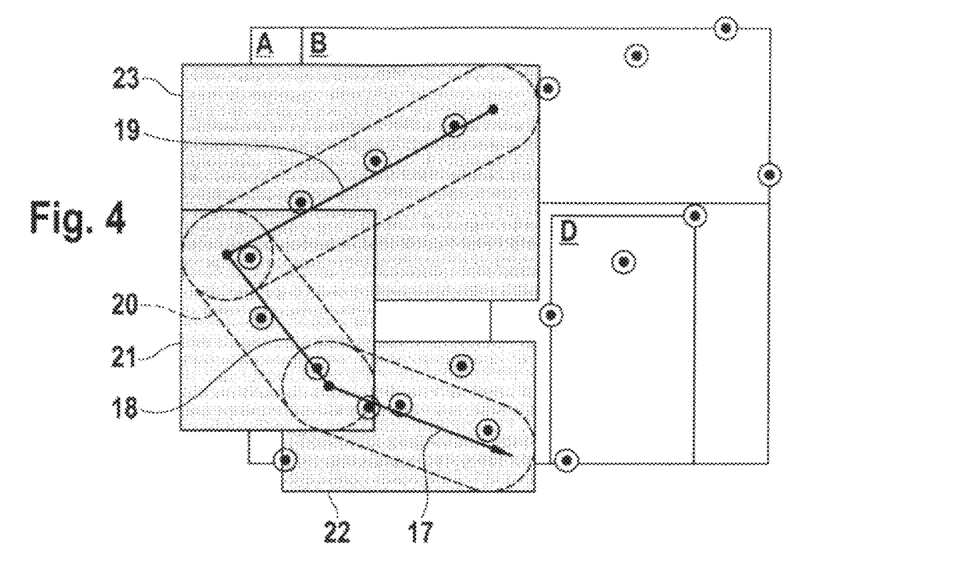
FIG. 4 an illustration of a step of generating intermediate minimum bounding boxes, preferably used in the video retrieval system in FIG. 1.

FIG. 4 illustrates the step of generating intermediate minimum bounding boxes for the remaining line segments 17 and 19 in the same manner as described for the middle segment line 18, so that finally for each line segment 17, 18 and 19 an intermediate minimum bounding box 21, 22 and 23 is created.

Figure 5:
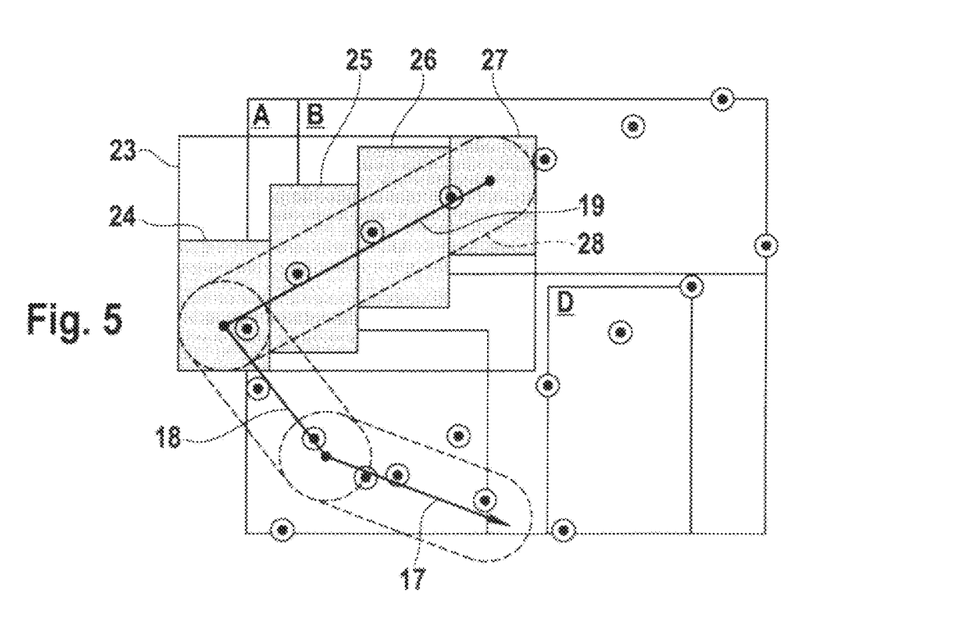
FIG. 5 an illustration of a step of splitting up intermediate minimum bounding boxes, preferably used in the video retrieval system in FIG. 1.

A following step of splitting up the intermediate bounding boxes 21, 22 and 23 is illustrated by the FIG. 5 in connection with the intermediate bounding box 23 as an example. The intermediate bounding box 23 is split up and partially reduced to the minimum bounding boxes 24, 25, 26 and 27. Concerning the width these minimum bounding boxes 24, 25, 26 and 27 are arranged side-by-side within the intermediate minimum bounding box 23 without overlap. Concerning the height the minimum bounding boxes 24, 25, 26 and 27 are adapted to the diameter of the range window 28 of the segment 19, so that the plurality of the minimum bounding boxes 24, 25, 26 and 27 covers the range window 28 completely. The width of the single minimum bounding boxes 24, 25, 26 and 27 is fixed to a pre-defined size, especially to a defined number of pixels, for example to 20 pixels, in the image 6. For other line segments and/or embodiments it is possible to arrange a plurality of minimum bounding boxes in the vertical direction side-by-side and adapt the width of the individual minimum bounding boxes. The step of splitting up is performed also for the remaining intermediate bounding boxes 21 and 22 concerning the segments 18 and 17, respectively. As a result of the splitting up step, the three intermediate minimum bounding boxes 21, 22 and 23 are converted into a plurality of minimum bounding boxes 24, 25, 26, 27 and further boxes. It shall be noticed that the intermediate step of generating intermediate bounding boxes 21, 22 and 23 is not strictly necessary, as the minimum bounding boxes 24, 25, 26, 27 and further boxes can also be generated by another algorithm.

In a first retrieval step the minimum bounding boxes 24, 25, 26, 27 and the further boxes are used as sub-queries and are sent to the database 5, whereby the search for similar trajectories or parts thereof is only performed in the rectangles of the tree-like data structure 16 overlaying with the minimum bounding boxes 24, 25, 26, 27 and further boxes, respectively. So—as an example—the minimum bounding box 26, only overlaps with the rectangle B, so trajectory data concerning the rectangles C and D is not accessed. The results of the sub-queries are combined in order to find matching trajectories and/or sub-trails for any or all of the segments 17, 18 and 19 of the sketched line-segments 7. Finally as a result a list of similar trajectories preferably in best-match order is returned.

From the foregoing it should be clear that an increase of the area covered by the minimum bounding boxes 24, 25, 26, 27 and the further boxes leads to an increase of the overlap area of the minimum bounding boxes 24, 25, 26, 27 and further boxes in their entirety with the indexing minimum bounding rectangles A, B, C and D, whereby the increase of overlap leads to an increase of data returned by the database 5. So splitting up and reducing the intermediate bounding boxes finally leads to a decrease of overlap and thus to a decrease of data returned by the database 5.

Figure 6:
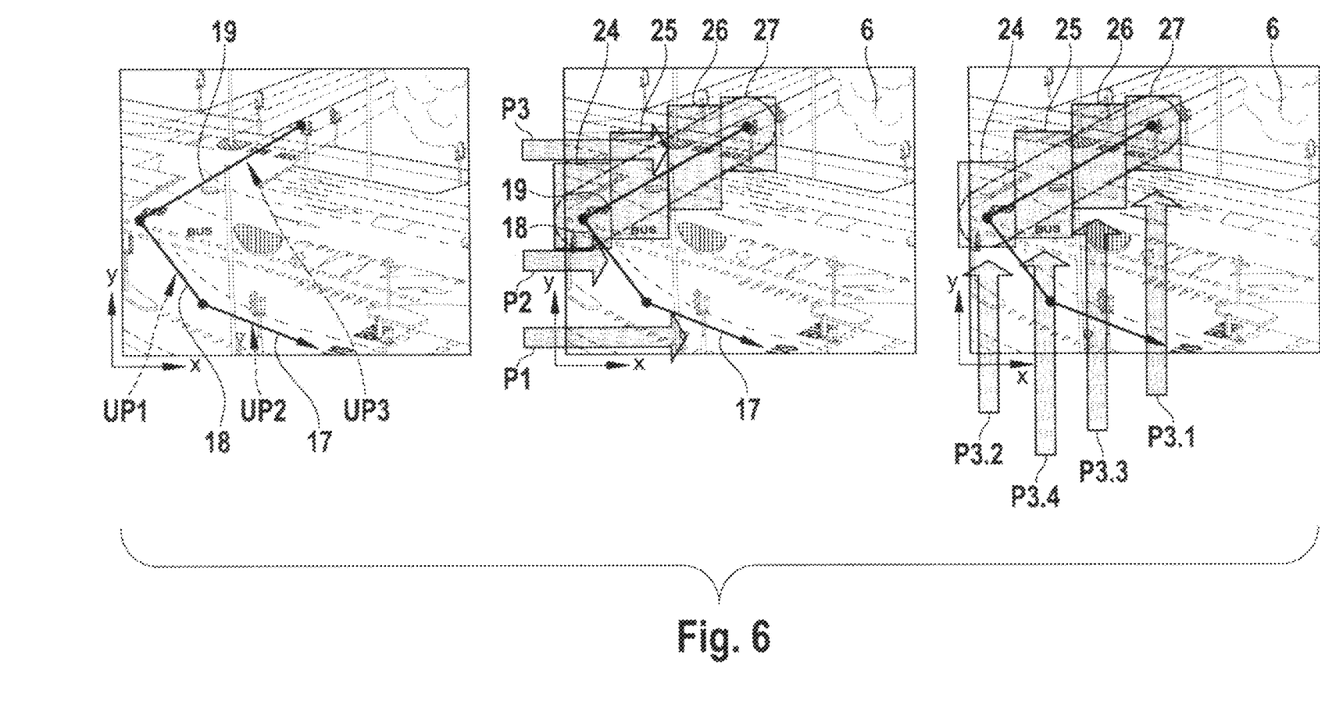
FIG. 6 an illustration of a step of allocating search priorities to the search segments and/or minimum bounding boxes, preferably used in the video retrieval system in FIG. 1.

FIG. 6 illustrates the optional step of setting priorities for the minimum bounding areas 24, 25, 26 and 27. It shall be noted that this step can also be used in case no step of splitting up is performed and the intermediate bounding boxes 21, 22 and 23 are used as minimum bounding boxes in connection with the sub-queries.

On the left hand side the same illustration of the image 6 as in FIG. 1 is shown with the same sketched line-segments 7. In this embodiment the user is additionally allowed to allocate priorities to the segments 17, 18 and 19 of the line-segments 7. As an example in FIG. 6 the user sets the segment 17 to a user priority 2, indicated by UP2, segment 18 to a user priority 1 (UP1) and segment 19 to a user priority 3 (UP3).

In the middle part of FIG. 6, the priorities for the segments 17, 18 and 19 are set by the video retrieval system 1 automatically, indicated by the arrows allocating the priorities P1 (priority 1) to the segment 17, P2 (priority 2) to the segment 18 and P3 (priority 3) to the segment 19. Further a combination of manually and automatically allocated priorities is possible. On the right hand side of FIG. 6 a step of sub-prioritising is illustrated, whereby sub-priorities P3.2, P3.4, P3.3, P3.1 are allocated to the minimum bounding boxes 24, 25, 26 and 27, whereby in this example the leading numeral (i.e. "3") is allocated manually or automatically as already explained and the second numeral (i.e. "0.2", "0.4", "0.3", "0.1") is generated as a sub-priority, preferably automatically. In operation the video retrieval system 1 performs the sub-queries in the order or sequence of the allocated priorities, so that—for example—first all sub-queries concerning minimum bounding boxes with a priority of 1 are processed, then—after retrieving the intermediate results of these sub-queries—sub-queries with the priority of 2 are launched. The priorities are preferably distributed, so that first areas with a low density and/or low busyness of moving objects are searched and thus only branches in the database with a low number of entries have to be accessed and/or first strategic relevant areas, like entry or exit or crossing areas are searched. The results of the high prioritised sub-queries are collected and used to produce fast intermediate results for the user.

The invention claimed is:

1. A video retrieval system (1) comprising
a retrieval means for retrieving trajectory data from a database as a response to a search query, whereby the search query is formulated on the basis of a search trajectory (7), which is representable and/or represented as a plurality of search segments (17, 18, 19),
whereby the retrieval means comprises interpreting means for generating a plurality of minimum bounding areas (24, 25, 26, 27), whereby the plurality of minimum bounding areas (24, 25, 26, 27) covers the search trajectory (7) or at least one of the search segments (17, 18, 19) and whereby the retrieval means is configured for accessing the database (5) by using at least one of the minimum bounding areas (24, 25, 26, 27) as a sub-query area, wherein the database returns trajectory data of trajectories, wherein the trajectories are indexed by indexing bounding areas overlapping with a respective query area and/or comprise interpolating points lying inside the respectively query area,
wherein the minimum bounding areas (24, 25, 26, 27) of the plurality of minimum bounding areas are arranged overlap-free and/or adjacently or with a search trajectory independent overlap; and
ranging means for generating a minimum matching range (20, 28) for the at least one of the search segments (17, 18, 19) and/or for the search trajectory (7), wherein the minimum matching range covers an area in a minimum spatial distance from the at least one of the search segments (17, 18, 19) and/or from the search trajectory (7), whereby the plurality of minimum bounding areas (24, 25, 26, 27) are configured to cover the minimum matching range (20, 28),
wherein the interpreting means are configured to generate an intermediate minimum bounding area (21, 22, 23) for the at least one of the search segments (17, 18, 19) and/or search trajectory (7) and to split the intermediate minimum bounding area (21, 22, 23) for generating the plurality of minimum bounding areas (24, 25, 26, 27), and
wherein after being split, the intermediate minimum bounding area is partially cancelled so that an area covered by the plurality of minimum bounding areas in an aggregate is smaller than an area of the respective intermediate bounding area
wherein the partial cancelling of the intermediate box includes adapting the minimum bounding areas to the minimum matching range of the at least one of the search segments, wherein a number of splits executed on the intermediate bounding area is dependent on a factor selected from the group consisting of a length of the at least one of the search segments, an angle between the at least one of the search segments and a preceding search segment, an angle between the at least one of the search segments of a search trajectory and an angle of the at least one of the search segments relative to an orientation of minimal bounding areas and wherein a maximum split-up is defined by a distance between interpolating points of the stored trajectory data and satisfies a condition that a minimum diameter of the minimum bounding areas is larger than or equal to a minimum distance of the interpolating points.

2. The video retrieval system (1) according to claim 1, wherein the minimum bounding areas (24, 25, 26, 27) are formed as rectangles.

3. The video retrieval system (1) according to claim 1, further comprising segmenting means configured to divide the search trajectory in search segments (17, 18, 19).

4. The video retrieval means (1) according to claim 1, further comprising filtering means for reducing a number of interpolating points (11, 13, 14) of trajectories (3a, b) to be stored in the database (5) and/or of the search trajectory (7).

5. The video retrieval system (1) according to claim 1, further comprising prioritizing means configured for allocating search priorities (UP1, UP2, UP3, P1, P2, P3) to the search trajectories (7) and/or to the search segments (17, 18, 19) and/or to the minimum bounding areas (24, 25, 26, 27).

6. The video retrieval system (1) according to claim 5, wherein the prioritizing means comprise input means for setting the priorities manually.

7. The video retrieval system (1) according to claim 5, wherein the prioritizing means are configured for setting the priorities automatically and/or for setting automatically sub-priorities (P3.1, P3.2, P3.3, P3.4) to manually and/or automatically defined priorities.

8. The video retrieval system (1) according to claim 5, wherein said system is configured for retrieving and/or displaying intermediate results on the basis of results of high prioritized search segments and/or minimum bounding areas without using results of lower prioritized search segments and/or minimum bounding areas.

9. A method for retrieving video data by using a video retrieval system, comprising:
formulating a search query on the basis of a search trajectory, which is representable and/or represented as a plurality of search segments, whereby a plurality of minimum bounding areas covers the search trajectory or at least one of the search segments;
accessing a database by using at least one of the minimum bounding areas as a sub-query area;
returning by the database of trajectory data of trajectories, wherein the trajectories are indexed by indexing bounding areas overlapping with a respective query area and/or comprise interpolating points lying inside the respectively query area;
retrieving trajectory data from the database as a response to the search query,
wherein the minimum bounding areas of the plurality of bounding areas are arranged overlap-free and/or adjacently or with a search trajectory independent overlap and/or in that search priorities (UP1, UP2, Ups, P1, P2, P3) are allocated to the search trajectories (7) and/or to at least one of the search segments (17, 18, 19) and/or to the minimum bounding areas (24, 25, 26, 27); and
providing ranging means;
generating a minimum matching range (20, 28) for the at least one of the search segments (17, 18, 19) and/or for the search trajectory (7) using said ranging means, wherein the minimum matching range covers an area in a minimum spatial distance from the at least one of the search segments (17, 18, 19) and/or from the search trajectory (7), whereby the plurality of minimum bounding areas (24, 25, 26, 27) are configured to cover the minimum matching range (20, 28), generating an intermediate minimum bounding area (21, 22, 23) for the at least one of the search segments (17, 18, 19) and/or search trajectory (7) and to split the intermediate minimum bounding area (21, 22, 23) for generating the plurality of minimum bounding areas (24, 25, 26, 27), and wherein after being split, the intermediate minimum bounding area is partially cancelled so that an area covered by the plurality of minimum bounding areas in an aggregate is smaller than an area of the respective intermediate bounding area wherein the partial cancelling of the intermediate box includes adapting the minimum bounding areas to the minimum matching range of the at least one of the search segments, wherein a number of splits executed on the intermediate bounding area is dependent on a factor selected from the group consisting of a length of the at least one of the search segments, an angle between the at least one of the search segments and a preceding search segment, an angle between the at least one of the search segments of a search trajectory and an angle of the at least one of the search segments relative to an orientation of minimal bounding areas and wherein a maximum split-up is defined by a distance between interpolating points of the stored trajectory data and satisfies a condition that a minimum diameter of the minimum bounding areas is larger than or equal to a minimum distance of the interpolating points.

10. A non-transitory computer-readable medium, comprising computer program code stored thereon for performing a method for retrieving video data, said computer program code comprising:

code for causing formulation of a search query on the basis of a search trajectory, which is representable and/or represented as a plurality of search segments, whereby a plurality of minimum bounding areas covers the search trajectory or at least one of the search segments;

code for causing a database to be accessed by using at least one of the minimum bounding areas as a sub-query area, wherein the database returns trajectory data of trajectories, wherein the trajectories are indexed by indexing bounding areas overlapping with a respective query area and/or comprise interpolating points lying inside the respectively query area;

code for causing trajectory data to be retrieved from the database as a response to the search query;

wherein the minimum bounding areas of the plurality of bounding areas are arranged overlap-free and/or adjacently or with a search trajectory independent overlap and/or in that search priorities (UP1, UP2, Ups, PI, P2, P3) are allocated to the search trajectories (7) and/or to the at least one of the search segments (17, 18, 19) and/or to the minimum bounding areas (24, 25, 26, 27); and code for causing generation of a minimum matching range (20, 28) for the at least one of the search segments (17, 18, 19) and/or for the search trajectory (7), wherein the minimum matching range covers an area in a minimum spatial distance from the at least one of the search segments (17, 18, 19) and/or from the search trajectory (7), whereby the plurality of minimum bounding areas (24, 25, 26, 27) are configured to cover the minimum matching range (20, 28), generating an intermediate minimum bounding area (21, 22, 23) for the at least one of the search segments (17, 18, 19) and/or search trajectory (7) and to split the intermediate minimum bounding area (21 22, 23) for generating the plurality of minimum bounding areas (24, 25, 26, 27), and wherein after being split, the intermediate minimum bounding area is partially cancelled so that an area covered by the plurality of minimum bounding areas in an aggregate is smaller than an area of the respective intermediate bounding area wherein the partial cancelling of the intermediate box includes adapting the minimum bounding areas to the minimum matching range of the at least one of the search segments, wherein a number of splits executed on the intermediate bounding area is dependent on a factor selected from the group consisting of a length of the at least one of the search segments, an angle between the at least one of the search segments and a preceding search segment, an angle between the at least one of the search segments of a search trajectory and an angle of the at least one of the search segments relative to an orientation of minimal bounding areas and wherein a maximum split-up is defined by a distance between interpolating points of the stored trajectory data and satisfies a condition that a minimum diameter of the minimum bounding areas is larger than or equal to a minimum distance of the interpolating points.

* * * * *